(12) United States Patent
Park et al.

(10) Patent No.: US 6,600,531 B1
(45) Date of Patent: Jul. 29, 2003

(54) LIQUID CRYSTAL CELL

(75) Inventors: Ku-Hyun Park, Anyang-shi (KR); Hyun-Ho Shin, Anyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 74 days.

(21) Appl. No.: 09/714,181

(22) Filed: Nov. 17, 2000

(30) Foreign Application Priority Data

Nov. 19, 1999 (KR) ............................................. 99-51594
Nov. 23, 1999 (KR) ............................................. 99-52213

(51) Int. Cl.$^7$ .......................................... G02F 1/1336
(52) U.S. Cl. ......................................... 349/99; 349/117
(58) Field of Search .................................. 349/99, 117

(56) References Cited

U.S. PATENT DOCUMENTS

| | | | | |
|---|---|---|---|---|
| 5,231,527 A | * | 7/1993 | Takanashi et al. | 349/155 |
| 5,389,288 A | * | 2/1995 | Rindo et al. | 349/155 |
| 5,497,256 A | * | 3/1996 | Aoyama et al. | 349/117 |
| 5,747,121 A | * | 5/1998 | Okazaki et al. | 349/117 |
| 6,353,467 B1 | * | 3/2002 | Wong et al. | 349/99 |

OTHER PUBLICATIONS

Morozumi, Materials and Assembling Process of LCDs, pp. 170–190, 1993.*
S.H. Ahn et al., LCD Lab., GoldStar Co. Ltd., *Electro-Optical Characteristics of FLTN–LCDs Optimized by Optical Compensation Method*, pp. 187–190.

H.S. Kwok, *Parameter Space Representation of Liquid Crystal Display Operating Modes* 1996 American Institute of Physics, J. Appl. Phys., vol. 80, No. 7, pp. 3687–3693 (Oct. 1, 1996).

* cited by examiner

Primary Examiner—James Dudek
(74) Attorney, Agent, or Firm—McKenna, Long & Aldridge LLP

(57) ABSTRACT

A liquid crystal cell having spaced apart opposed and first and second substrates. First and second orientation films having first and second rubbing directions are on opposing surfaces of the first and the second substrates. First and second polarizers having first and second transmittance axis directions are on exterior surfaces of the first and the second substrates. A liquid crystal having a twisted angle "ø" is interposed in a gap "d" between the first and the second orientation films. The first transmittance axis direction is perpendicular to the second transmittance axis direction. The first and the second rubbing direction form an angle of ø. The first and second rubbing directions form angles of $(90°-ø/2)$ with the first and second transmittance axis directions. The gap "d" is equal to the distance that produces optimum transmittance of the liquid crystal cell. The optimum transmittance is found in accord with a Jones matrix and a parameter space approach, with the angle $(90-ø)/2$ being a factor.

16 Claims, 5 Drawing Sheets

LIQUID CRYSTAL CELL

This application claims the benefit of Korean Patent Application No. 1999-051594, filed on Nov. 19, 1999, the entirety of which is hereby incorporated by reference for all purposes as if fully set forth herein, and the benefit of Korean Patent Application No. 1999-0052213, filed on Nov. 23, 1999, the entirety of which is also hereby incorporated by reference for all purposes as if fully set forth herein, both under 35 U.S.C. § 119.

BACKGROUND OF THE INVENTION

1. Field of the Invention

The present invention relates to a liquid crystal cell design for a liquid crystal display (LCD) device, and more particularly, to a liquid crystal cell that uses a twisted nematic (TN) liquid crystal.

2. Discussion of the Related Art

Conventional LCD devices include display panels. Such display panels have upper and lower substrates that are attached with each other, and a liquid crystal, such as a twisted nematic (TN) liquid crystal, interposed there between. Such display panels are operationally divided into a plurality of liquid crystal cells. On exterior surfaces of the upper and the lower substrates, polarizers and retardation films, or compensation films are selectively attached.

A major consideration in the design of liquid crystal cells is the characteristics of the particular liquid crystal that is used. A good liquid crystal should have a short response time, a low gray scale, a wide viewing angle, and should be operational at low voltages. However, it is very difficult to find a liquid crystal that has all of these characteristics. Thus, various designs have been adopted for liquid crystal display devices.

Among the various types of TN liquid crystals, a low twisted nematic (LTN) liquid crystal has advantages of a short response time and a good gray scale. However, it typically has a low contrast ratio and relatively poor color dispersion properties. Other twisted nematic (TN) liquid crystals have twisted angles of 90 degrees, or those employing an in-plating switching (IPS) mode. Those liquid crystals can provide a wide viewing angle, but afterimages are produced during moving images and their brightness is relatively low. The anti-ferroelectric liquid crystal (AFLC) or an optical compensated birefringence (OCB) have advantages of a wide viewing angle and a short response time, although there are problems with contrast ratios and cell gap alignment.

Of particular interest to this invention is the difficulty of determining the optimum design parameters of a liquid crystal cell. A liquid crystal cell design should take into consideration many parameters, including liquid crystal arrangement and the transmittance axis directions of the polarizers. However, as there are simply too many important factors to consider it is humanly impossible to consider them all. Accordingly, computer simulation is usually used to process the design parameters and to arrive at an optimum liquid crystal cell.

One such computer simulation is the parameter space approach. The parameter space approach provides a graph that illustrates transmittance with respect to the product of a cell's thickness and birefringence when under a non-electric field condition. In the parameter space graph, the optimum parameter values of cell thickness and birefringence product "dΔn", or "d.DELTA.n" where the transmittance is highest can be easily found. The d.DELTA.n is calculated using a Jones matrix formulation.

As the Jones matrix formulation (and the generalized geometric optics approximation [GGOA]) has been fully discussed elsewhere it need not be repeated in detail here. An important point to note is that in the Jones matrix formulation the liquid crystal director (the direction in which the molecules line up) is assumed to be uniform over the entire cell. However, it is well known that the tilt angle decreases in the middle of the liquid crystal cell due to elastic energy minimization, especially for high pretilt angle cases. However, since an average tilt angle can be used without producing any significant error in predicting the properties of the LCD, most computer simulations assume that the tilt angle is zero.

The basic configuration and operation of a twisted nematic liquid crystal device will be provided. Then, a more detailed description of the parameter space method will be given. As shown in FIG. 1, first and second polarizers 10 and 16, respectively, having first and second transmittance axis directions 40 and 42 that are perpendicular to each other, are opposed with and spaced apart from each other. Between the two polarizers 10 and 16 are first and second transparent substrates 12 and 14, which are also opposed with and spaced apart from each other. Spacers are used to maintain the cell gap between the substrates. For example, plastic balls or silica balls having a diameter of 4 to 5 micrometers can be sprayed on the first substrate.

Still referring to FIG. 1, the first and the second transparent substrates 12 and 14 include first and second orientation films 20 and 22, respectively, on their opposing surfaces. Between the first and the second orientation films 20 and 22 is a positive TN liquid crystal 18.

The positive TN liquid crystal has a characteristic that it becomes arranged according to the direction of an applied electric field. The first and the second polarizer 10 and 16, respectively, transmit light that is parallel with their transmittance-axis directions 40 and 42, but reflect or absorb light that is perpendicular to their transmittance-axis directions 40 and 42.

The first and the second orientation films 20 and 22 were previously rubbed in a proper direction with a fabric. This rubbing causes the positive TN liquid crystal molecules between the first and the second transparent substrates 12 and 14 to become tilted several degrees from each substrate surface. First and second rubbing directions 50 and 52 of the first and the second orientation films 20 and 22 are, respectively, parallel with the transmittance-axis directions of the first and the second polarizer 10 and 16. When no electric field is applied to the positive TN liquid crystal 18, the orientation of the liquid crystal molecules becomes twisted from one substrate to the other at a definite angle, that being the twisted angle of the positive TN liquid crystal 18.

During operation, a back light device 24 irradiates white light onto the first polarizer 10. The first polarizer 10 transmits only the portion of the light that is parallel with the first transmittance-axis direction 40. The result is a first linearly polarized light 26 that passes through the polarizer 10. The first linearly polarized light 26 then passes through the positive TN liquid crystal 18 via the first transparent substrate 12.

As the first polarized light 26 passes through the positive TN liquid crystal 18, the first linearly polarized light 26 changes its phase according to the twisted alignment of the positive TN liquid crystal molecules. Accordingly, the first linearly polarized light 26 becomes an elliptically (possibly circularly) polarized light 28.

The elliptically polarized light 28 passes through the second transparent substrate 14, and meets the second polarizer 16. When the elliptically polarized light 28 passes through the second polarizer 16, the second polarizer 16 transmits only the portion of the elliptically polarized light 28 that is parallel to the second transmittance-axis direction 42. A polarized light 30 is then emitted. At the above-mentioned operation mode, a white state is displayed.

Turning now to FIG. 2, when a voltage supplier 35 induces an electric field through the positive TN liquid crystal 18, the positive TN liquid crystal molecules rotate and become arranged such that the longitudinal axes of the molecules become perpendicular to the surfaces of the first and second substrates 12 and 14. Accordingly, the first linearly polarized light 26 passes through the first transparent substrates 12, the positive TN liquid crystal 18, and the second transparent substrate 14 without phase change. The first linearly polarized light 26 then meets the second polarizer 16. As the second polarizer 16 has the second transmittance-axis direction 52 that is perpendicular to the first linearly polarized light 26, the second polarizer 16 absorbs or shields most of the first linearly polarized light 26. Thus, little or none of the first linearly polarized light 26 passes through the second polarizer 16. Accordingly, a dark state is displayed.

The conventional parameter space approach will be explained in some detail with references to FIGS. 3 and 4. FIGS. 3 and 4 show transmittance graphs of a liquid crystal cell according to FIGS. 1 and 2. In the transmittance graphs, white and black regions illustrate the highest and the lowest transmittances of the liquid crystal cell, respectively.

For FIG. 3, the rubbing directions of the first and the second orientation films are, respectively, parallel with the transmittance axis directions of the first and the second polarizers. At a portion "A" the corresponding twist angles are below 90 degrees, additionally, no white region appears, which means that there is no acceptable optimum d.DELTA.n.

For FIG. 4, the angles between the rubbing directions of the first and the second orientation films and the transmittance axis directions of the first and the second polarizers are, respectively, −45 and 45 degrees (or vice versa). A portion "B", where the corresponding twist angle is about 45 degrees, is dark. This also means that there is no acceptable optimum d.DELTA.n.

Accordingly, if the twist angle of the TN liquid crystal is below 90 degrees, the optimum d.DELTA.n can not be found in the transmittance graph produced from the conventional parameter space approach.

SUMMARY OF THE INVENTION

Accordingly, the principles of the present invention relate to liquid crystal cells that are designed to substantially obviate one or more of the problems due to the limitations and disadvantages of the related art.

It is an object of the present invention to provide a liquid crystal display device that has a short response time, a wide viewing angle, and a low gray scale.

It is another object of the present invention to provide a fabricating method for the same liquid crystal display device.

In view of the foregoing and other problems of the conventional design methods, it is an object of the present invention to provide a liquid crystal cell that includes first and second substrates that are spaced apart from and opposed to each other. The liquid crystal cell further includes first and second orientation films that have, respectively, first and second rubbing directions and that are positioned, respectively, on opposing surfaces of the first and the second substrates. First and second polarizers that have, respectively, perpendicular first and second transmittance axis directions are positioned, respectively, on the outer surfaces of the first and the second substrates. A liquid crystal having a twisted angle "ø" (assumed to be continuous in the liquid crystal cell) is interposed between the first and the second orientation films, with the first and the second orientation films being separated by a gap "d". The first and the second rubbing directions form an angle "ø". Furthermore, the first rubbing direction is at an angle of (90−ø)/2 with the first transmittance axis direction, and the second rubbing direction is at an angle of (90−ø)/2 with the second transmittance axis direction.

The gap "d" is set (by design) to provide optimum transmittance with the angle (90ø)/2 as a factor. Optimum transmittance, and thus the gap "d," is determined using a Jones matrix and a parameter space approach.

In another aspect, the principles of the present invention provide a liquid crystal display device including first and second substrates that are spaced apart from and opposed with each other, and first and second orientation films, respectively, positioned on opposing surfaces of the first and second substrates. The first and second orientation films having first and second rubbing directions, respectively. A TN liquid crystal having a twisted angle "ø" is interposed between the first and second substrates and a compensation film is positioned on an outer surface of the second substrate. A first polarizer having a first transmittance axis direction is located on an outer surface of the first substrate such that the first transmittance axis direction makes an angle of (90−ø)/2 degrees with the first rubbing direction of the first orientation film. A second polarizer having a second transmittance axis direction is located on an outer surface of the compensation film such that the second transmittance axis direction is perpendicular to the first transmittance axis direction and makes an angle of (90−ø)/2 degrees.

The liquid crystal display device further includes patterned spacers between the first and second substrates, wherein the spacers have a height of 2 micrometers.

The compensation film beneficially has a phase difference of 10 to 60 nanometers.

In another aspect, the present invention provides a method for fabricating a liquid crystal display device. The fabricating method includes preparing first and second substrates, forming first and second orientation films, respectively, on a surface of the first and second substrates, and rubbing the first and second orientation films to create first and second rubbing directions. Spacers are patterned on the first orientation film. The fabricating method further includes attaching the first and second substrates together such that the first and second orientation films oppose each other, inserting a TN liquid crystal having a twisted angle "ø" between the first and second orientation films, and attaching a compensation film to an outer surface of the second substrate. Then, first and second polarizers are respectively attached to the outer surfaces of the first substrate and to the compensation film. The first and second polarizers, respectively, having first and second transmittance axis directions, with the first and second transmittance axis directions being perpendicular to each other and making an angle of (90−ø)/2 with the first and second rubbing direction, respectively. Beneficially, the spacers have a height of 2 micrometers.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings. However, it should be understood that the written description and the specific examples, while indicating preferred embodiments of the invention, are given by way of illustration only. Various changes and modifications within the spirit and scope of the invention will become apparent to those skilled in the art from this detailed description.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF AN ILLUSTRATED EMBODIMENT

Reference will now be made in detail to an embodiment of the present invention, the example of which is illustrated in the accompanying drawings.

Figure 1:
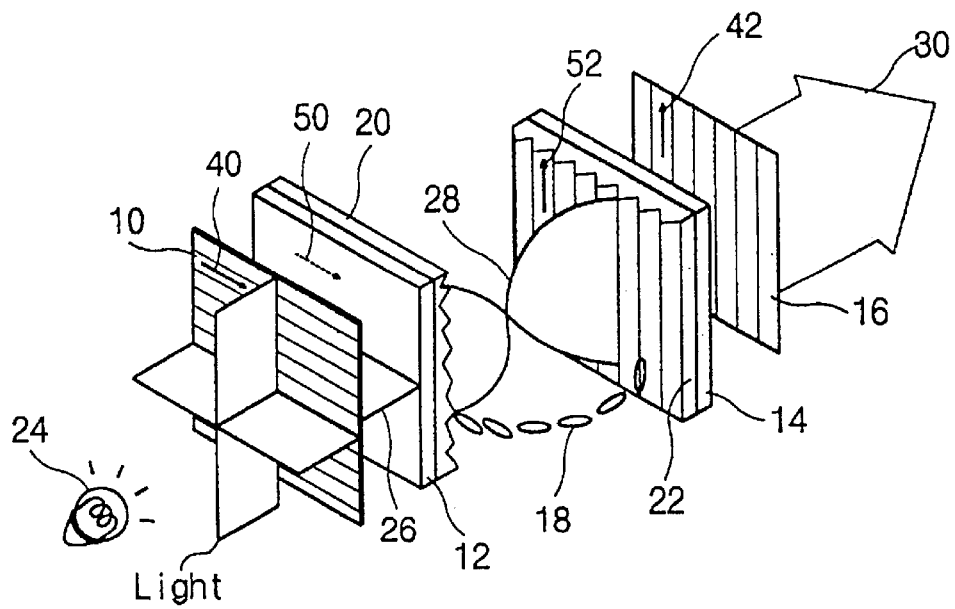
FIGS. 1 and 2 illustrate a configuration and an operation of a liquid crystal cell.
Figure 2:
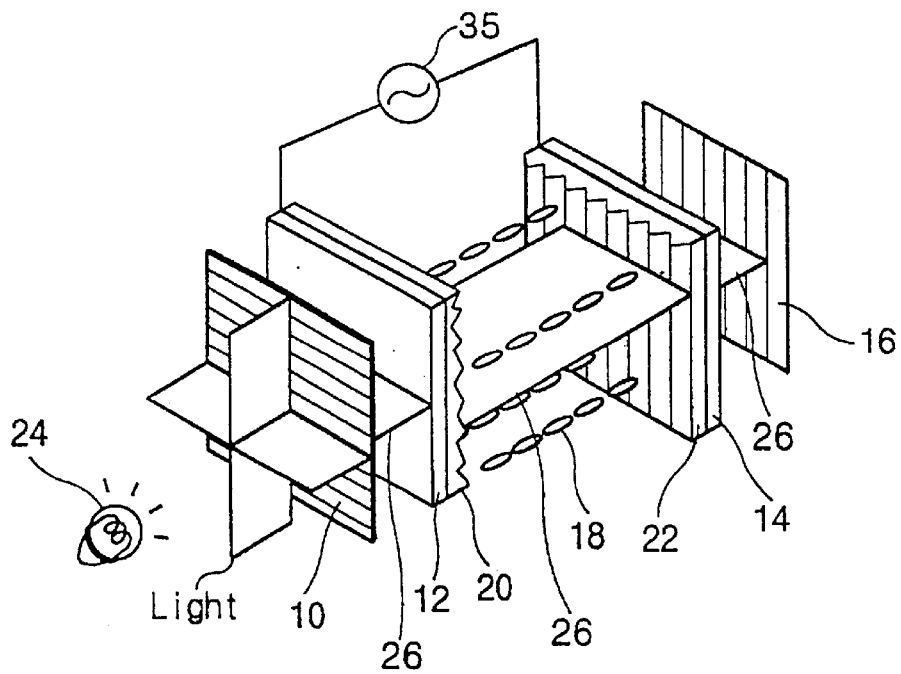
Figure 3:
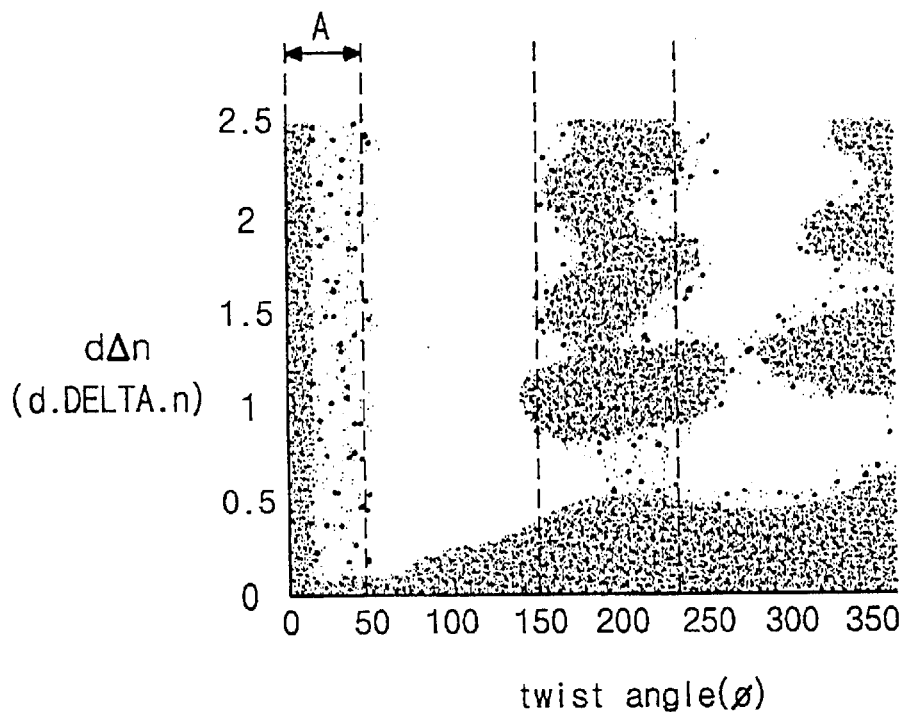
FIGS. 3 and 4 are transmittance graphs according to a conventional parameter space approach.
Figure 4:
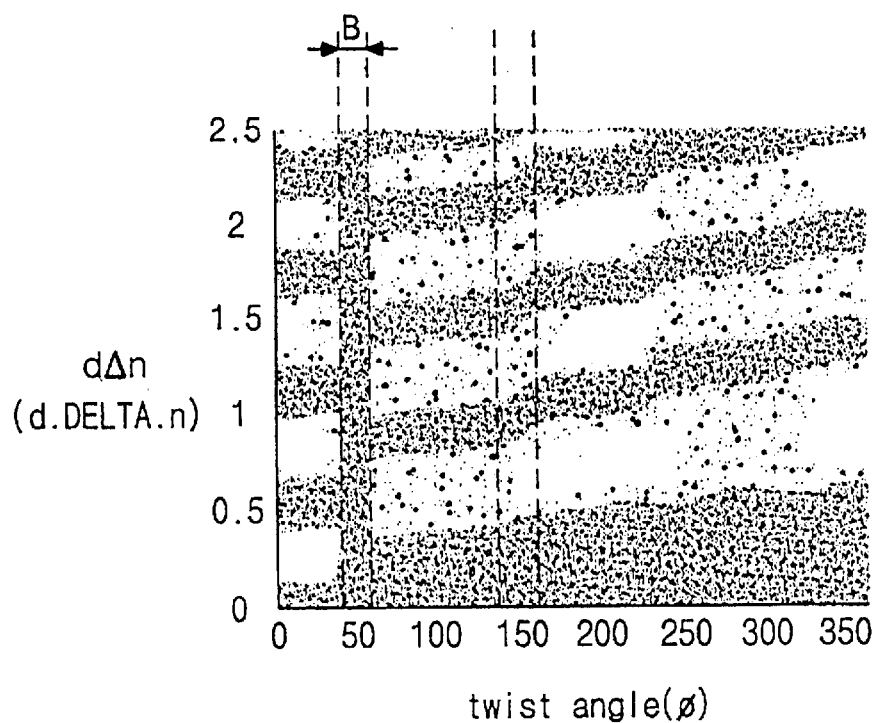
Figure 5:
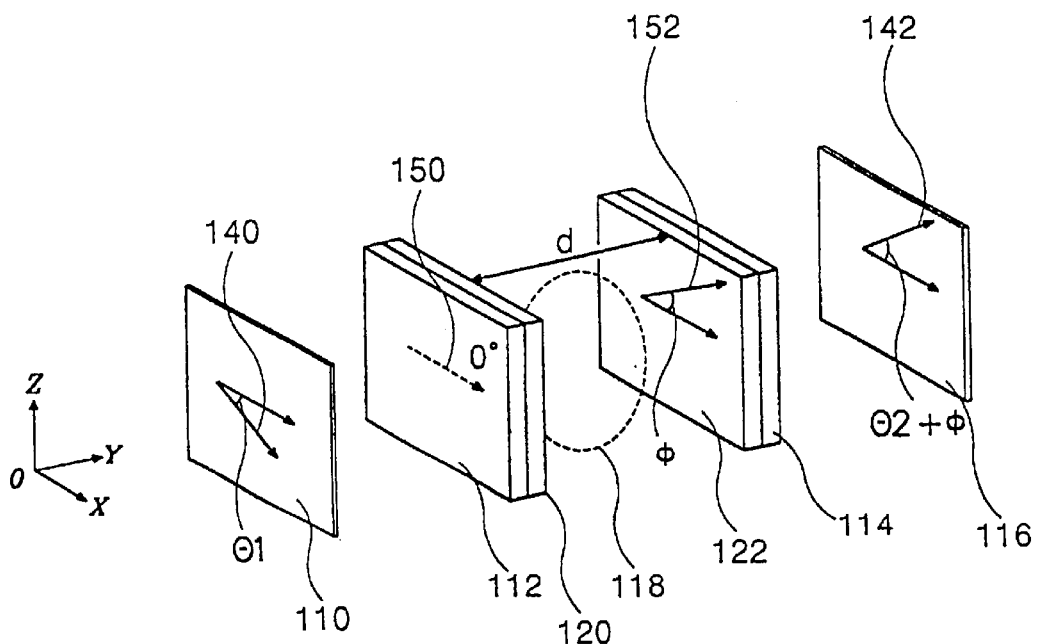
FIG. 5 illustrates a configuration of the elements of a liquid crystal cell.

FIG. 5 illustrates a general configuration of the elements of a liquid crystal cell. As shown, a liquid crystal cell includes a first polarizer 110 and a second polarizer 116. The first polarizer 110 is adjacent a first transparent substrate 112 while the second polarizer 116 is adjacent a second transparent substrate 114. The first and second transparent substrates are opposed with and spaced apart from each other. The first transparent substrate 112 includes a first orientation film 120 while the second transparent substrate 114 includes a second orientation film 122. The first and the second orientation films 120 and 122 are separated by a gap distance "d", which is referred to as the cell thickness. Between the first and the second orientation films 120 and 122 is a TN liquid crystal 118.

Still referring to FIG. 5, the first polarizer 110 has a first transmittance axis direction 140, while the second polarizer 116 has a second transmittance axis direction 142 that is perpendicular to the first transmittance axis direction 140. The first orientation film 120 is rubbed at a direction 150, and the second orientation film 122 is rubbed at a direction 152. The first and second rubbing directions 150 and 152 form an interior angle "ø" that has the same angle as the twisted angle of the TN liquid crystal 118.

The first transmittance axis direction 140 and the first rubbing direction 150 form a first interior angle "θ1", and the second transmittance axis direction 142 and the second rubbing direction 152 make a second interior angle "θ2". Accordingly, the angle between the first rubbing direction 150 of the first orientation film 112 and the second transmittance axis direction 142 of the second polarizer 116 is (ø+θ2).

When the first and the second interior angles "θ1" and "θ2" have the same value, and when the first and the second transmittance axis directions 140 and 142 form an angle of 90 degrees, the angle between the first and the second interior angles "θ1" and "θ2" becomes (90°−ø)/2.

Figure 6:
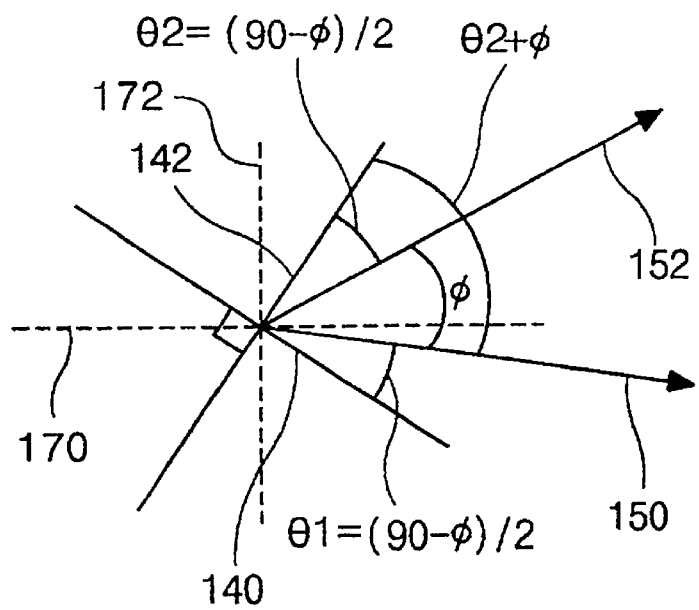
FIG. 6 illustrates a graphical algorithm according to a preferred embodiment of the present invention.

FIG. 6 graphically illustrates the angles of the above-mentioned configuration. The first transmittance axis direction 140 is shown perpendicular to the second transmittance axis direction 142. The first interior angle "θ1" formed between the first rubbing direction 150 and the first transmittance axis direction 140, and second interior angle "θ2" formed between the second transmittance axis direction 142 and the second rubbing direction 152 are also shown. The first interior angle "θ1" and the second interior angle "θ2" are equal. Also shown is the angle "ø" between the first and second interior angles. As can be seen, the angle "θ1" and the angle "θ2" are both (90°−ø)/2 degrees. As the twisted angle "ø" of the TN liquid crystal 118 varies, the interior angle between the transmittance axis directions and the rubbing directions vary such that the first and second interior angles θ1=θ2=(90°−ø)/2.

Figure 7:
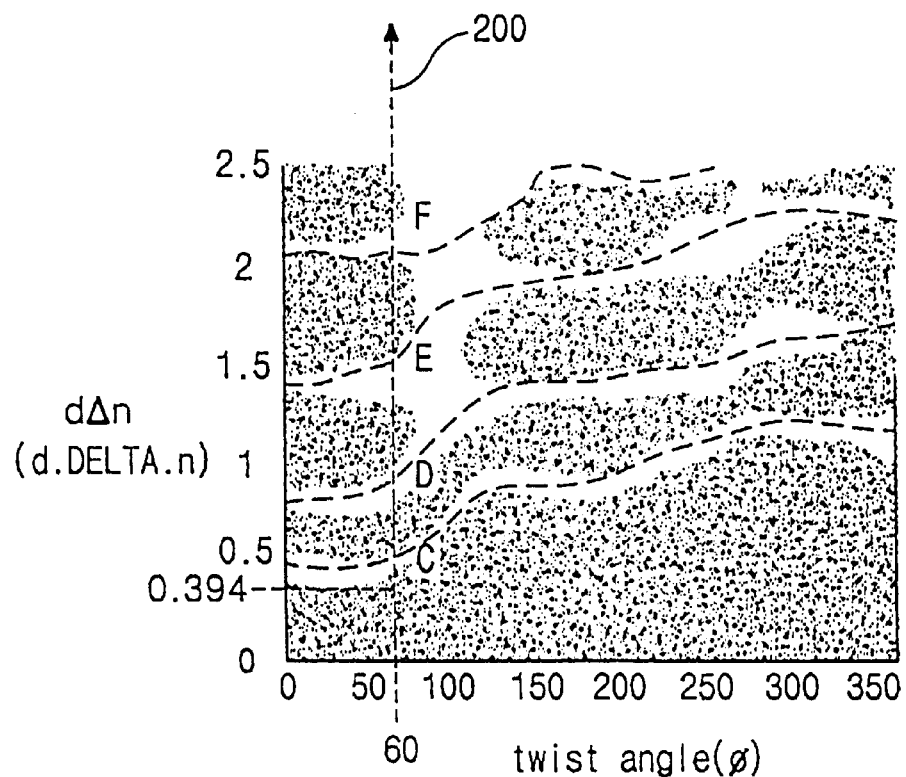
FIG. 7 is a transmittance graph produced from a parameter space approach according to a preferred embodiment of the present invention.

FIG. 7 is a transmittance graph produced by the parameter space approach that includes the above-mentioned algorithm. Whatever the twisted angle "ø" is, there exists at least four values of "d.DELTA.n" where the transmittance is highest.

For example, when the twisted angle "ø" is 60 degrees, a vertical line 200 positioned at 60 degrees crosses four white regions "C", "D", "E", and "F". The smallest "d.DELTA.n" among the values of "d.DELTA.n" corresponding to the four white regions is 0.349, which can be found on the boundary between white region "C" and the adjacent dark region. Since the "d" of "d.DELTA.n" is the cell thickness, and the birefringence "DELTA.n" is fixed according to the twisted angle "ø" independently of the cell thickness "d", the optimum value of "d.DELTA.n" to make the liquid crystal cell the thinnest should be 0.349.

Figure 8:
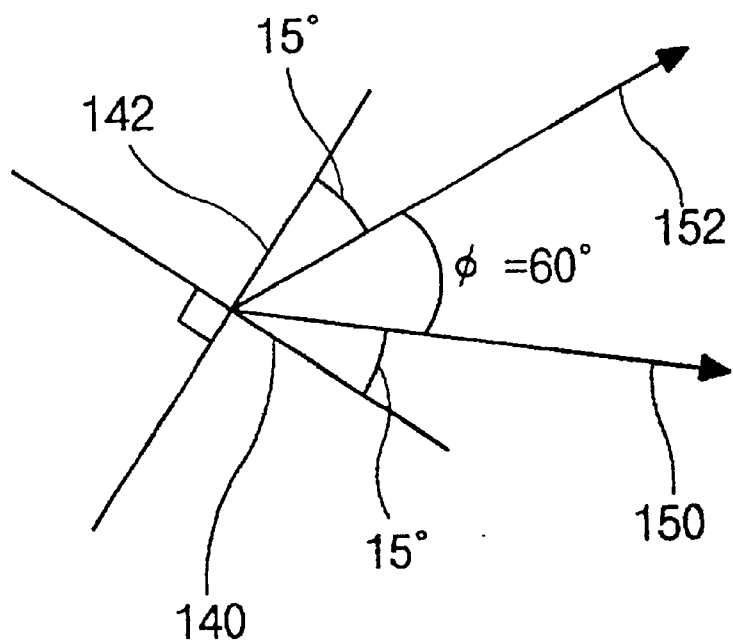
FIG. 8 shows an example of the graphical algorithm where real values are applied.

FIG. 8 graphically illustrates the various angles of a display according to FIG. 5, assuming that the display is in accord with the principles of the present invention. According to FIG. 8 the LTN liquid crystal 118 material has a twisted angle of 60 degrees. Then, the first and the second interior angles "θ1" and "θ2" each becomes 15 degrees. Accordingly, to obtain the highest transmittance with the LTN liquid crystal having the twisted angle of 60 degrees, the d.DELTA.n should be 0.349. Furthermore, the rubbing directions of the first and the second orientation films should make angle of 15 degrees with the first and the second polarizers, respectively.

Further, since the transmittance graph of FIG. 6 produced according to the principles of the present invention covers the range of twisted angles, the foregoing design method is applicable to liquid crystal cells that employ a TN or a super twisted nematic (STN) liquid crystal.

Figure 9:
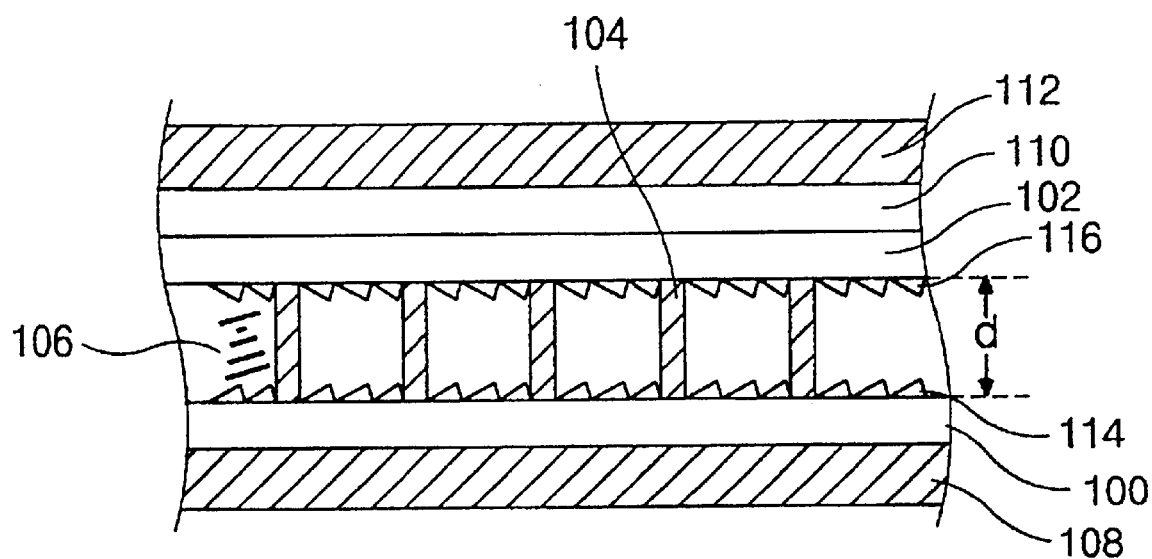
FIG. 9 is a cross-sectional view of a liquid crystal display device according to the principles of the present invention.

FIG. 9 shows a cross sectional view of a liquid crystal display device according to the principles of the present invention. That liquid crystal display device employs a low twisted nematic (LTN) liquid crystal having a twisted angle of less than 90 degrees.

To obtain a short response time the cell gap "d" between a first substrate 100 and a second substrate 102, where the liquid crystal is interposed, should be small. Accordingly, in the embodiment illustrated in FIG. 9 the cell gap is designed to be 2 micrometers. That distance is in consideration of the pitch of the LTN liquid crystal. To obtain this cell gap patterned spacers 104 are used.

As shown in FIG. 9, a plurality of spacers 104 having a uniform height are arranged on the first substrate 100, and the second substrate 102 is attached to the first substrate 100. An LTN liquid crystal 106 is interposed between the first and the second substrates 100 and 102. To form the spacers 104, a polymer is uniformly deposited and hardened on the first substrate 100. That polymer is then patterned to form the spacers 104.

On outer surfaces of the first and second substrates 100 and 102, a first polarizer 108 and a compensation film 110 are positioned, respectively. On the compensation film 110, a second polarizer 112 is positioned. The compensation film 110 is beneficially a uniaxial film that raises the contrast ratios of the liquid crystal display device. The first and second polarizers 108 and 112, respectively, have perpendicular first and second transmittance axis directions, and the compensation film 110 has perpendicular slow and fast axes.

On opposing inner surfaces of the first and second substrates 100 and 102 are first and second orientation films 114 and 116, respectively. To form the orientation films 114 and 116 an orientation material, such as polyimide, is deposited on the first and second substrates 100 and 102. That orientation material is then rubbed by a suitable fabric in the proper directions. In particular, the first and second orientation films 114 and 116 have first and second rubbing directions that correspond to the twisted angle of the LTN liquid crystal 106. Instead of a fabric, light can be used for rubbing.

The relationships between the transmittance axis directions of the first and second polarizers 108 and 112, and the first and second rubbing directions of the first and second orientation films 114 and 116 are in accord with FIG. 6. While the first and second transmittance axis directions (140 and 142) are perpendicular to each other, the first and second rubbing directions (150 and 152) form an angle having the same value as the twisted angle of the liquid crystal, "ø".

Still referring to FIG. 6, the first and second transmittance axis directions 140 and 142 respectively, make first and second interior angles of (90−ø)/2 with the first and second rubbing directions 150 and 152. Furthermore, the slow axis 170 of the compensation film 110 is positioned between the first and the second rubbing direction 150 and 152 such that the slow axis 170 makes an angle of "ø/2" with them. The compensation film 110 having the slow and fast axes 170 and 172 is designed to provide a phase difference of 10 to 60 nanometers, with respect to the twisted angle "ø" of the LTN liquid crystal 106.

By applying a Jones matrix to the liquid crystal display device according to the embodiment illustrated in FIG. 9, an optimized birefringence product cell gap "d", where a transmittance of the liquid crystal display device becomes highest, with respect to the various twisted angles "ø" of the LTN liquid crystal can be determined. Table. 1 shows the result.

TABLE 1

| Twisted angle (ø) | Optimized "d" (µm) | Twisted angle (ø) | Optimized "d" (µm) |
|---|---|---|---|
| 0 | 0.2750 | 50 | 0.323 |
| 5 | 0.2754 | 55 | 0.335 |
| 10 | 0.277 | 60 | 0.349 |
| 15 | 0.279 | 65 | 0.364 |
| 20 | 0.282 | 70 | 0.382 |
| 25 | 0.286 | 75 | 0.402 |
| 30 | 0.291 | 80 | 0.425 |
| 35 | 0.297 | 85 | 0.45 |
| 40 | 0.304 | 90 | 0.476 |
| 45 | 0.313 | — | — |

For example, when the twisted angle "ø" is 60 degrees, the optimized birefringence product cell gap "d" becomes 0.349.

While the invention has been particularly shown and described with reference to the preferred embodiments thereof, it will be understood by those skilled in the art that the foregoing and other changes in form and details may be made therein without departing from the spirit and scope of the invention. Thus, it is intended that the present invention covers the modifications and variations of this invention provided they come within the scope of the appended claims and their equivalents.

What is claimed is:

1. A method of fabricating a liquid crystal cell, comprising:

obtaining a first substrate with a first orientation film having a first rubbing direction;

obtaining a second substrate with a second orientation film having a second rubbing direction;

spacing the first substrate and the second substrate apart from each other by a gap "d" such that the first orientation film and the second orientation film are opposed to each other and such that the first rubbing direction and the second rubbing direction form an angle ø that is less than 90°;

locating a first polarizer having a first transmittance axis on the exterior of the first substrate such that the first transmittance axis and the first rubbing direction form an angle (90°−ø)/2;

locating a second polarizer having a second transmittance axis on the exterior of the second substrate, wherein the second transmittance axis is perpendicular to the first transmittance axis, and wherein the second transmittance axis and the second rubbing direction form an angle (90°−ø)/2;

placing a liquid crystal having a twisted angle of in the gap "d", the gap "d" produces optimum transmittance of the liquid crystal cell; and placing a compensation film on the second substrate;

wherein the compensation film has a phase difference of 10 to 60 nanometers.

2. The method according to claim 1, wherein a Jones matrix and a parameter space approach are employed to find the optimum transmittance.

3. The method according to claim 2, wherein the gap "d" is the smallest possible gap that produces optimum transmittance.

4. The method according to claim 1, wherein a plurality of spacers form the gap "d".

5. The method according to claim 1, wherein the spacers are comprised of a polymer.

6. The method according to claim 1, wherein the first orientation film is polyimide.

7. A liquid crystal display device comprising:

first and second substrates that are spaced apart and opposed to each other;

first and second orientation films on, respectively, the first and second substrates, wherein the first and second orientation films having, respectively, first and second rubbing directions, and wherein the first and second rubbing directions form an angle ø that is less than 90°;

a liquid crystal between the first and second substrates, the liquid crystal has a twisted angle of ø;

a compensation film on the second substrate, the compensation film has a phase difference of 10 to 60 nanometers;

a first polarizer on the first substrate, the first polarizer having a first transmittance axis direction that forms an angle of (90°−ø)/2 degrees with the first rubbing direction; and a second polarizer on the compensation film, the second polarizer having a second transmittance axis direction that forms an angle of (90°−ø)/2 degrees with the second rubbing direction, and that forms an angle of 90° with the first transmittance axis direction.

8. The liquid crystal display device according to claim 7, further comprising spacers between the first and second substrates.

9. The liquid crystal display device according to claim 8, wherein the spacers have a height of 2 micrometers.

10. The liquid crystal display device according to claim 8, wherein the spacers are comprised of a polymer.

11. The liquid crystal display device according to claim 7, wherein the angle ø is at most 90 degrees.

12. The liquid crystal display device according to claim 7, wherein the first orientation film is polyimide.

13. A fabricating method for a liquid crystal display device, comprising:

forming first and second orientation films, respectively, on first and second substrates;

producing first and second rubbing directions on the first and second orientation films;

attaching the first and second substrates together;

forming a compensation film on the second substrate, the forming of the compensation film produces a compensation film having a phase difference of 10 to 60 nanometers; and forming first and second polarizers, respectively, on the first and second substrates, wherein the first and second polarizers respectively have first and second transmittance axis directions that form angles of (90°−ø)/2 with the first and second rubbing direction, respectively, wherein ø is less than 90°.

14. The fabricating method according to claim 13, further comprising patterning spacers on the first orientation film.

15. The fabricating method according to claim 14, wherein the spacers have a height of 2 micrometers.

16. The fabricating method according to claim 14, wherein the spacers are formed from a polymer.

* * * * *